United States Patent [19]

DeLong et al.

[11] Patent Number: 5,065,556
[45] Date of Patent: Nov. 19, 1991

[54] SPACE DIVIDING PARTITION SYSTEM HAVING AN ELECTRICAL RACEWAY

[75] Inventors: Ronald B. DeLong, Belmont; Brian J. Persing, Grand Rapids; Charles G. Raabe, Leonard Heights; James R. Bouse, Belmont, all of Mich.; Peter F. Bemis, Sheboygan, Wis.; Hollerbach, Eric T., Gross Pointe Park, Mich.; Bradley J. Bruggink, Oostburg; Daniel Cykana, Sheboygan, both of Wis.

[73] Assignee: Westinghouse Electric Corp., Pittsburgh, Pa.

[21] Appl. No.: 523,776

[22] Filed: May 15, 1990

[51] Int. Cl.⁵ .............................................. E04F 19/06
[52] U.S. Cl. .................................... 52/221; 52/239; 160/135; 160/351
[58] Field of Search ................... 52/221, 239; 160/135, 160/351

[56] References Cited

U.S. PATENT DOCUMENTS

| | | | |
|---|---|---|---|
| 1,815,447 | 7/1931 | Richardson | 52/221 |
| 4,133,153 | 1/1979 | Hage | 52/220 |
| 4,135,775 | 1/1979 | Driscoll | 52/221 |
| 4,224,769 | 9/1980 | Ball et al. | 52/221 |
| 4,277,123 | 7/1987 | Haworth et al. | 339/22 R |
| 4,278,834 | 7/1987 | Boundy | 174/48 |
| 4,360,705 | 11/1982 | Rogers | 174/48 |
| 4,406,101 | 9/1983 | Heidmann | 52/220 |
| 4,463,046 | 7/1984 | Hutchinson et al. | 428/156 |
| 4,593,505 | 6/1986 | Russell | 52/221 |
| 4,596,098 | 6/1986 | Finkbeiner et al. | 52/220 |
| 4,634,212 | 1/1987 | Boundy et al. | 339/198 R |
| 4,713,918 | 12/1987 | Cioffi | 52/221 |
| 4,769,199 | 9/1988 | Bemis et al. | 264/139 |
| 4,800,695 | 1/1989 | Menchetti | 52/221 |
| 4,841,699 | 6/1989 | Wilson et al. | 160/351 |
| 4,905,428 | 3/1990 | Sykes | 52/126.4 |
| 4,918,886 | 4/1990 | Benoit et al. | 52/221 |

Primary Examiner—Richard E. Chilcot, Jr.
Assistant Examiner—Joanne C. Downs
Attorney, Agent, or Firm—D. R. Lackey

[57] ABSTRACT

An office space dividing partition having an electrical raceway. The raceway includes an extruded plastic spine having a vertical web; a top portion which includes an extruded mounting slot; a bottom portion which includes first and second extruded grooves and a noise seal; and, an intermediate portion which defines four passageways for communication and power wiring. First and second extruded plastic side panels are telescoped into engagement with the first and second extruded grooves of the spine. An extruded panel-to-raceway connector connects the spine to the bottom edge of an office space dividing panel. Raceway stabilizers extend outwardly from the spine to engage support posts which support the panels. Raceway shrouds, which conceal the posts adjacent to the ends of the raceways, are positionally keyed to the spine for accurate mating with the side panels of the raceway.

19 Claims, 8 Drawing Sheets

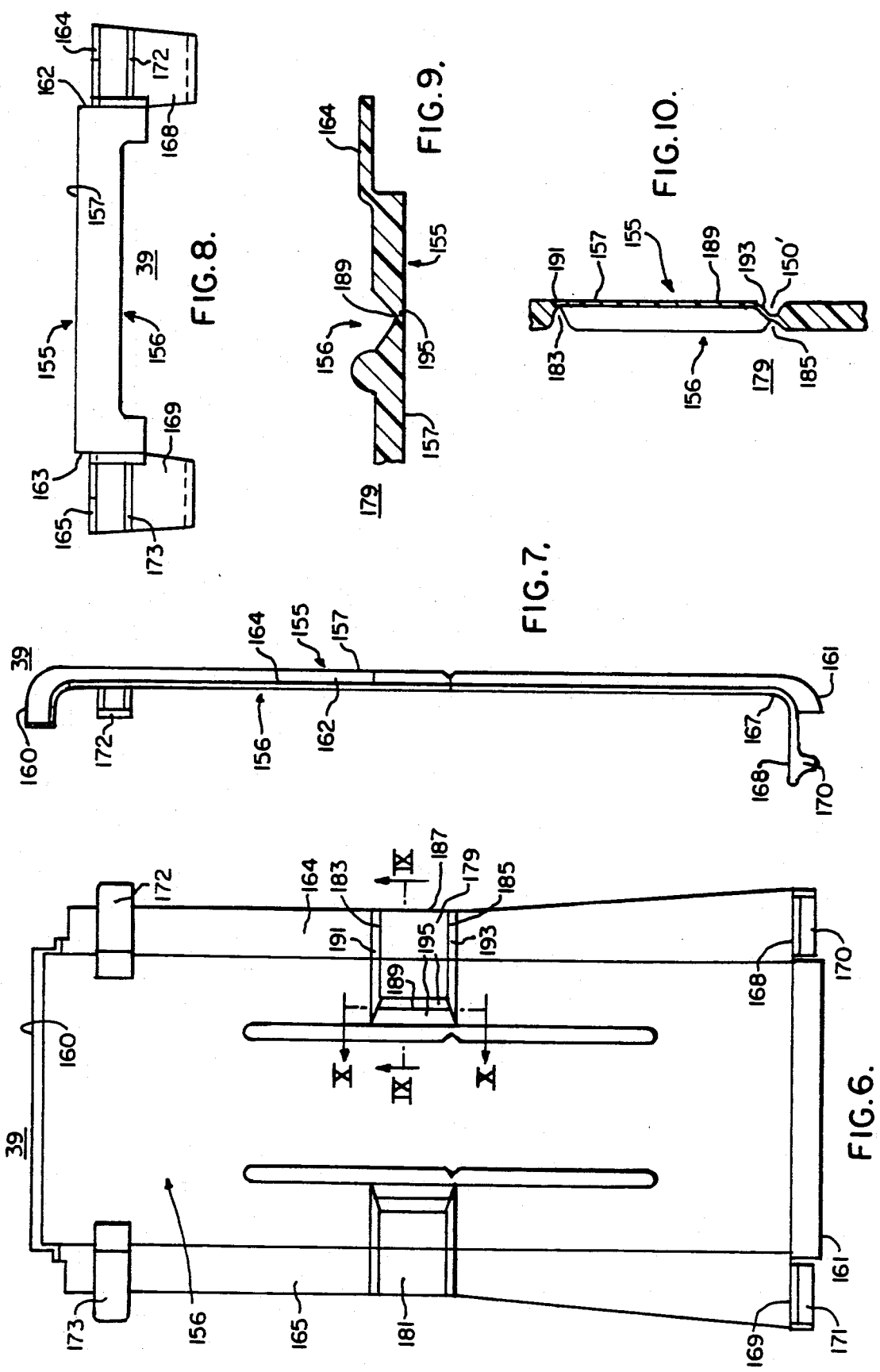

000
SPACE DIVIDING PARTITION SYSTEM HAVING AN ELECTRICAL RACEWAY

TECHNICAL FIELD

The invention relates in general to open plan office space dividing partition systems, and more specifically to such space dividing partition systems which have electrical raceways along their base.

BACKGROUND ART

Open plan office space dividing systems often require substantial amounts of power wiring and communications cabling to be concealed in a base raceway, as well as to be readily accessible to users of the offices and work stations created by such systems.

In addition to providing adequate wiring capacity, such a raceway should have many other desirable characteristics, from both the user's and manufacturer's viewpoints. For example, the raceway must be readily and easily integratable into a partition system, and in keeping with the flexibility advantage of an open plan office space dividing system, it should be easy to disassemble and re-configure the system electrically as well as functionally. Further, the raceway should be mechanically sturdy, it should enable wiring to be quickly positioned within and removed from the wiring passageways defined by the raceway, it should be easy to manufacture and assemble with a minimum of parts, it should maintain its structural integrity notwithstanding quick and easy assembly, and the raceway should have an attractive appearance which smoothly blends with any type of partition system it is used with.

SUMMARY OF THE INVENTION

Briefly, the present invention is an open plan office space dividing partition system having an electrical raceway which combines the desirable aspects of such a raceway set forth above, to provide an easily manufactured, easily assembled, aesthetically pleasing multicompartment raceway with a minimum of parts.

More specifically, the raceway is assembled using only five different parts, all of which may be plastic, and three of which may be extruded. An extruded plastic spine defines four large wiring passageways, two for communication wiring and two for power wiring. The extruded spine further provides attachment points for telescopically receiving and/or positionally keying the remaining four basic parts of the raceway assembly, i.e., (1) an extruded partition-to-raceway attachment member or mounting member which is fixed to a bottom edge of an associated panel, frame or partition, (2) extruded identical first and second side panels, (3) injection molded raceway stabilizer members, and (4) injection molded post-concealing shrouds. The bottom of the spine includes a dual durometer co-extrusion in the form of a compressible boot which conforms to the floor where the associated partition is mounted to provide a light and noise seal.

The partition-to-raceway connector or mounting strip is a dual durometer extrusion which includes friction pads formed of a softer more flexible material than the remaining portion of the mounting strip, which friction pads contact the spine and resist disassembly of the spine once it has been telescoped over the mounting strip.

The raceway stabilizer member is preferably an injection molded part which incorporates an integral curved section which functions as a leaf spring as the stabilizer member is telescoped into an extruded bottom slot of the spine. This permits the stabilizer member to be inserted into the slot to an assembly position in which the stabilizer member clears a leveler support leg of the associated partition system, and then be retracted to a functional position in which the stabilizer member engages the leveler support leg, all while being in firm frictional engagement with the extruded bottom slot.

The raceway side panels are extruded to the desired configuration, including an enlarged longitudinally extending bead along a bottom edge which is dimensioned to snugly telescope with a longitudinally extending slot or groove defined by the spine. A longitudinally extending dual durometer hinge is located immediately adjacent to the attachment bead, and a dual durometer flange end extends along an upper edge for frictionally engaging the spine.

The post-concealing raceway shrouds are positionally keyed to the spine, and thus they are always aligned with and flush with the raceway side panels, which are also positionally related to the spine. A pair of cable egress openings are provided in a 180 degree shroud, which is used when two panels are supported by a post in a straight line. The cable egress openings are covered with cable egress covers formed integrally with the shroud, until the initial use of an opening. When it is desired to use a cable egress opening, two thin severable attachment sides are severed, and a "living" hinge which extends between ends of the sides maintains the cover captive, while allowing the cover to hinge out of the way of any cable or cables which extend through the opening.

BRIEF OF THE DRAWINGS

FIG. 6 is a rear elevational view of the shroud shown in FIG. 5;

FIG. 7 is an end elevational view of the shroud shown in FIG. 6;

FIG. 8 is top plan view of the shroud shown in FIGS. 6 and 7;

FIG. 9 is a cross-sectional view of the shroud shown in FIG. 6, taken between and in the direction of arrows IX—IX;

FIG. 10 is a cross-sectional view of the shroud shown in FIG. 6, taken between and in the direction of arrows X—X;

Figure 13:
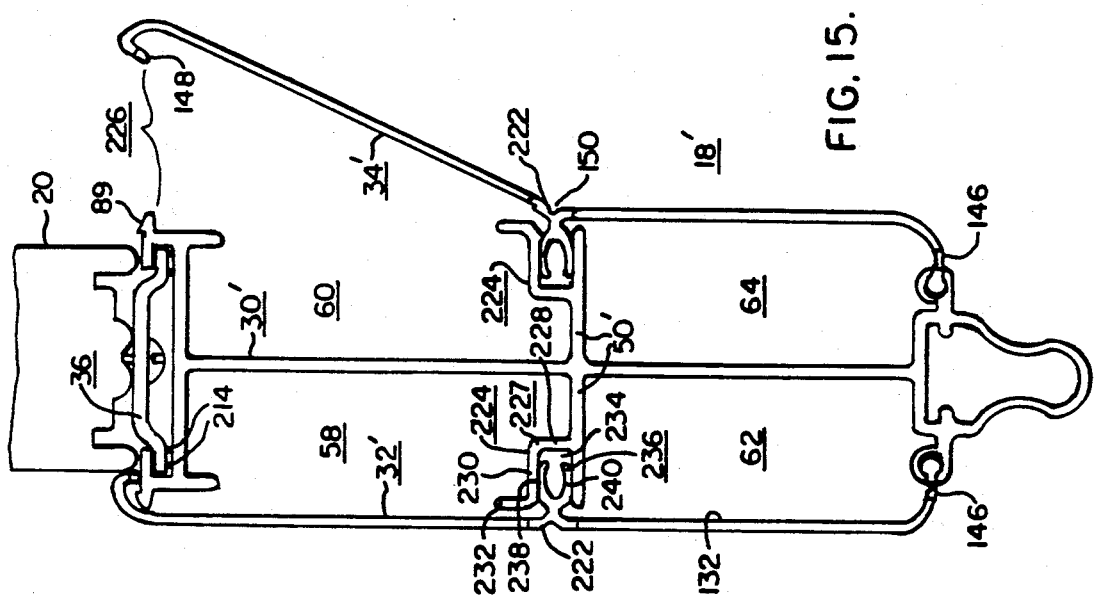
FIG. 13 is an enlarged end view of the raceway and associated partition shown in FIGS. 1 and 2.
Figure 14:
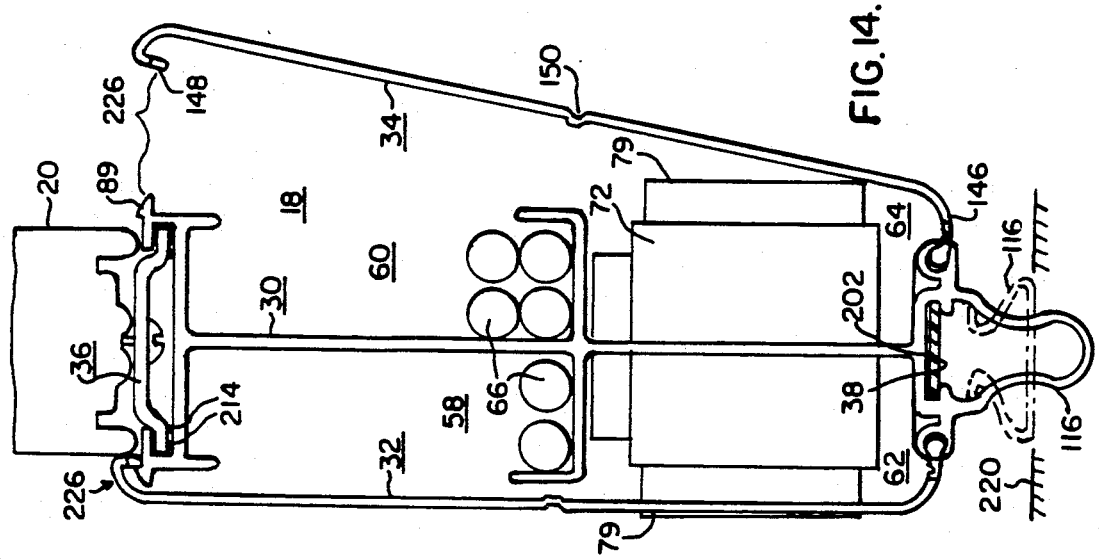
Figure 15:
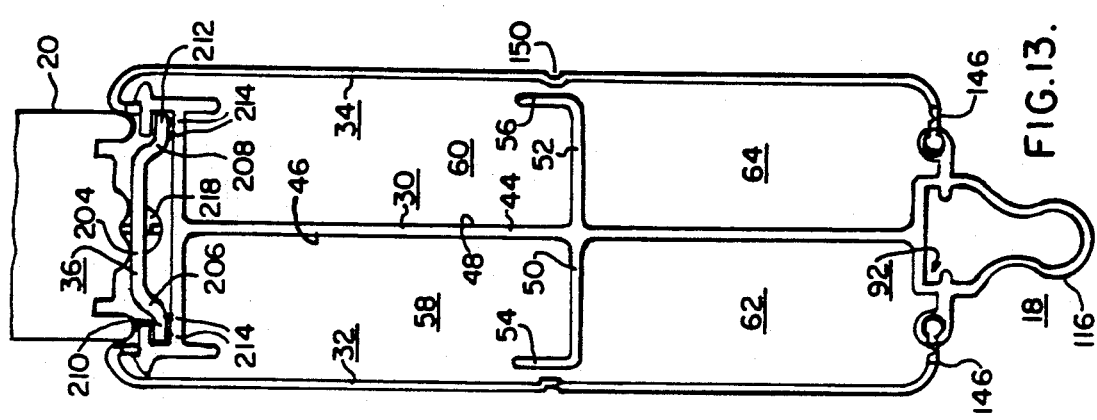

FIG. 14 is an end view of the raceway and partition, similar to FIG. 13, except illustrating communication wiring and an electrical terminal block, and also illustrating one side cover in a partially open position; and FIG. 15 is an end view similar to FIG. 13, illustrating a dual hinge side panel embodiment of the invention which may be used to provide access to the upper communication wiring passageway without opening the lower wiring passageway, all with a single side panel.

DESCRIPTION OF PREFERRED EMBODIMENTS

Figure 1:
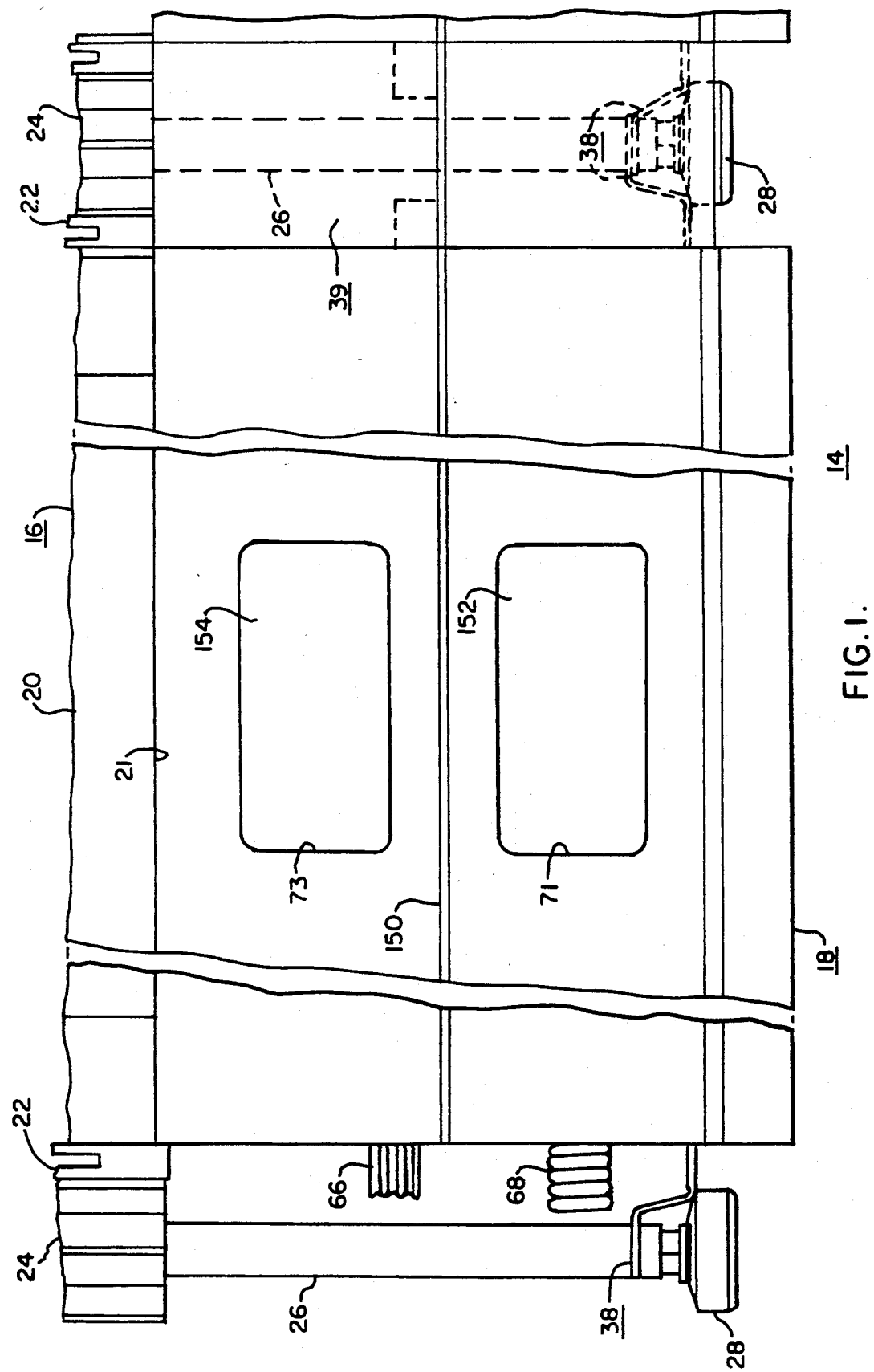
FIG. 1 is an elevational view of a partition and raceway assembly constructed according to the teachings of the invention.

Referring now to the drawings, and to FIG. 1 in particular, there is shown a fragmentary lower portion of an open plan office space dividing partition system 14 constructed according to the teachings of the invention. For a more expanded view of an open office plan system, reference may be had to U.S. Pat. No. 4,278,834, which is assigned to the same assignee as the present application. In general, system 14 includes a partition assembly 16 and a raceway assembly 18. The partition assembly 16 may be of any suitable type having frames, panels or partitions, with or without support posts between the frames, panels or partitions. For purposes of example, the partition assembly 16 is illustrated as being similar to that to the aforesaid patent, which uses panels and supporting posts between the panels. For example, partition assembly 16 includes a panel 20 having a bottom edge 21, and slotted standards 22 at opposite vertical edges thereof which have hooks which are supported by hook receiving cups (not shown) on support poles 24 which include leveler legs 26 and glides 28.

Figure 2:
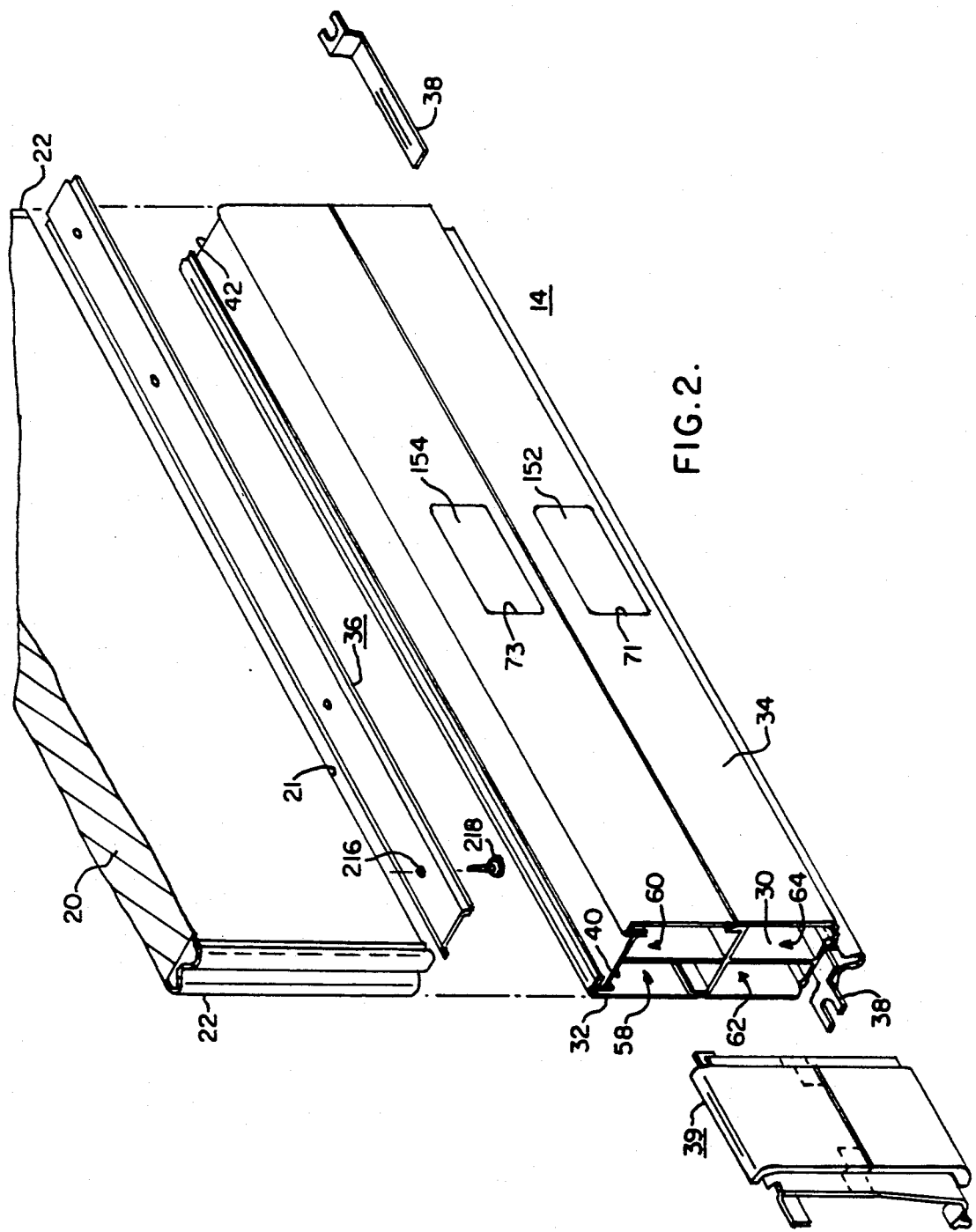
FIG. 2 is a partially exploded perspective view of the partition and raceway shown in FIG. 1, without the partition support means and levelers shown in FIG. 1.

Raceway 18, as more clearly shown in a partially exploded perspective view in FIG. 2, uses only five different parts, an extruded plastic raceway spine 30, first and second extruded plastic side panels 32 and 34 which are of like construction, an extruded plastic raceway-to-panel mounting strip 36, raceway stabilizers 38 which are preferably injection molded using a high strength plastic such as polypropylene, and raceway shrouds 39 which conceal the post at the raceway level. The shrouds 39 are preferably injection molded of ABS (acrylonitrile- butadiene- styrene)

Figure 3:
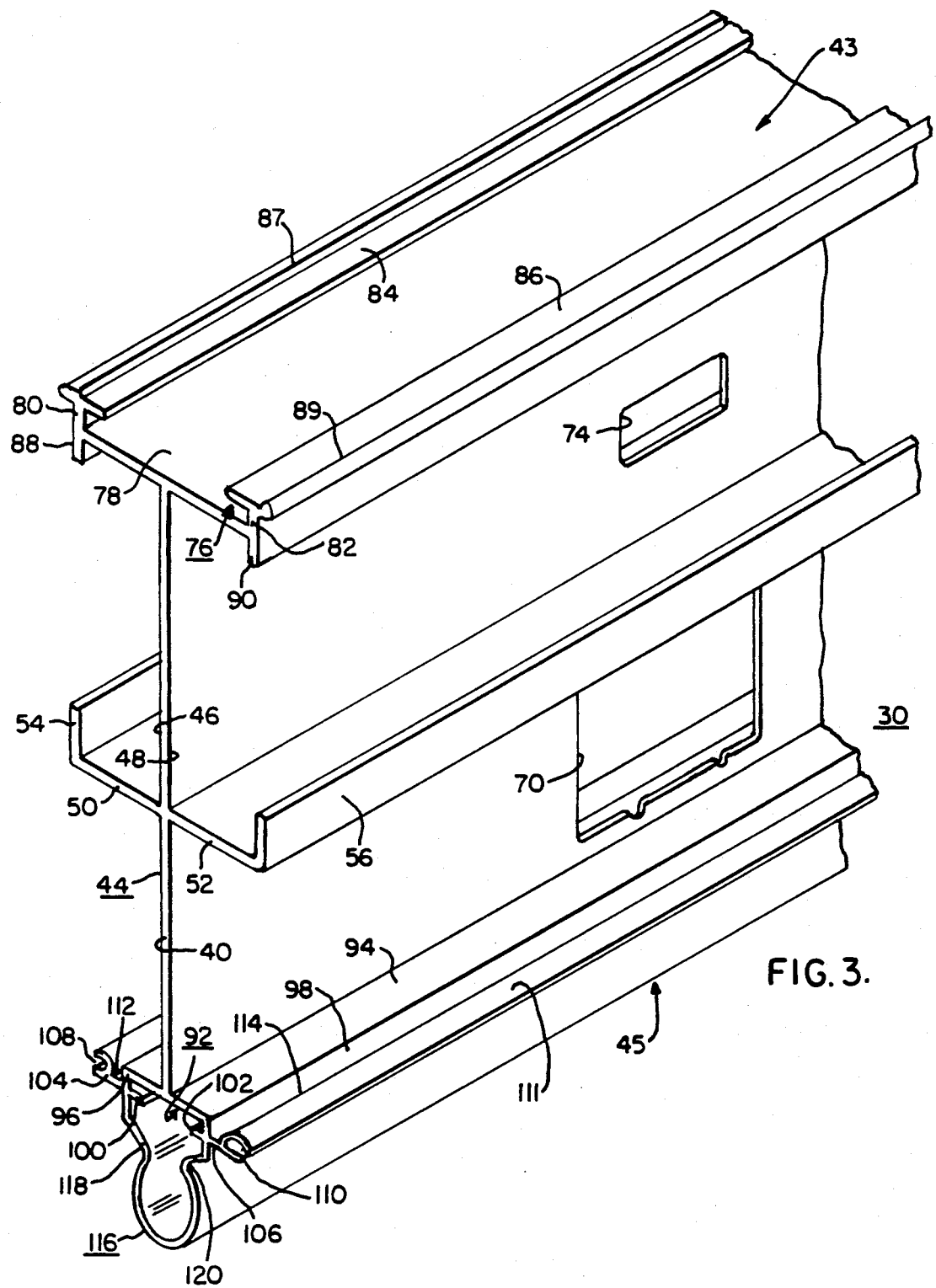
FIG. 3 is a fragmentary perspective view of an extruded plastic spine.

Extruded plastic spine 30, best shown in a fragmentary perspective view in FIG. 3, is formed of a suitable synthetic resin or plastic selected for its high strength and durability, such as rigid polyvinylchloride (PVC). Spine 30 is an elongated structure having a length substantially equal to the width of the panel 20 the raceway 18 is to be associated with. Spine 30 has first and second longitudinal ends 40 and 42, with the second end being shown in FIG. 2, and top and bottom portions 43 and 45, respectively. Spine 30 includes a centrally disposed web 44 which extends between ends 40 and 42, as well as between the top and bottom portions 43 and 45. Spine 30 is symmetrical about web 44, i.e., the spine 30 on one side of the web 44 is a mirror image of the spine on the other side.

Web 44 has first and second major opposed sides 46 and 48, with first and second shelf-like members 50 and 52, hereinafter called intermediate shelves, extending perpendicularly outward from sides 46 and 48, at a location intermediate the top and bottom portions 43 and 45. Intermediate shelves 50 and 52 respectively terminate in up-turned flanges 54 and 56.

As best shown in FIG. 2, the intermediate shelves 50 and 52, along with web 44 and the first and second side panels 32 and 34, define four large wiring passageways, including first and second upper wiring passageways 58 and 60, and first and second lower wiring passageways 62 and 64. In a preferred embodiment of the invention, as best shown in FIG. 1, the upper wiring passageways 58 and 60 are used for communication wiring 66, and the lower wiring passageways 62 and 64 are used for power wiring 68.

An opening 70 is cut in web 44 below the intermediate shelves 50 and 52, at predetermined locations opposite to electrical power receptacle openings 71 in the side panels 32 and 34, to provide a place for snap mounting an electrical terminal block 72 shown in FIG. 11. Terminal block 72 has electrical outlets or receptacles 79 associated therewith in a well known manner, enabling users to plug equipment into the electrical power system of the building. U.S. Pat. No.4,634,212, which is assigned to the same assignee as the present application, may be referred to if more information is desired relative to mounting of terminal blocks.

An opening 74 is also cut in web 44 above intermediate shelves 50 and 52, opposite to communication receptacle openings 73 in side panels 32 and 34, to enable communication receptacles to be used which have a depth greater than the dimension between a side panel 32 or 34 and the web 44.

The top portion 43 of spine 30 includes an extruded, upwardly facing C-shaped slot 76 which includes a flat horizontal portion 78, and upwardly turned side portions 80 and 82 which respectively terminate in horizontal, inwardly facing flanges 84 and 86. Flanges 84 and 86 are provided with retaining lips 87 and 89 for releasably retaining side panels 32 and 34, respectively. The sides 80 and 82 have depending portions 88 and 90, respectively, to provide retaining flanges for shrouds 39 which conceal the support post.

The bottom portion 45 of spine 30 includes an extruded, downwardly facing C-shaped bottom slot 92, which includes a flat horizontal portion 94, and downwardly turned side portions 96 and 98 which respectively terminate in horizontal, inwardly facing lips or flanges 100 and 102.

Outwardly extending flanges 104 and 106 are provided at the lower ends of side portions 96 and 98, and they respectively terminate in extruded grooves 108 and 110 for telescopically receiving spine connector portions of the side panels 32 and 34. The extruded grooves 108 and 110 have portions 111 which curve upwardly from the level of their associated flanges 104 and 106, to provide spaces or grooves 112 and 114 between side portions 96 and 98 and the extruded grooves 108 and 110 for locating bottom portions of the hereinbefore mentioned shrouds 39 which interconnect raceways 18 of adjacent panels.

A depending hollow boot portion 116 formed of a softer, more flexible plastic than the rigid plastic used for the portion of spine 30 described up to this point, is co-extruded with spine 30 at a location below bottom slot 92. For example, a more highly plasticized and thus softer and more flexible PVC may be used for boot 116. Boot 116 deforms under pressure when the raceway 18 is installed below partition or panel 20, to provide a noise and light seal below the raceway 18. In a preferred embodiment of boot 116, depending side walls 118 and 120 of boot 116 start at a predetermined thickness dimension, such as 0.060 inch, and as the side walls 118 and 120 start to change from radii located outside boot 116 to a radius located within boot 116, the wall thins, such as to about 0.030 inch. This aids in providing the desired resilient deflection and conformation to the floor, as the boot 116 is compressed FIG. 1 illustrates boot 116 in an unstressed configuration, and the glides 28 are shown at floor height, indicating the amount that boot 116 will be compressed when the bottom of boot 116 is at the same level as the bottoms of the glides 28.

Figure 4:
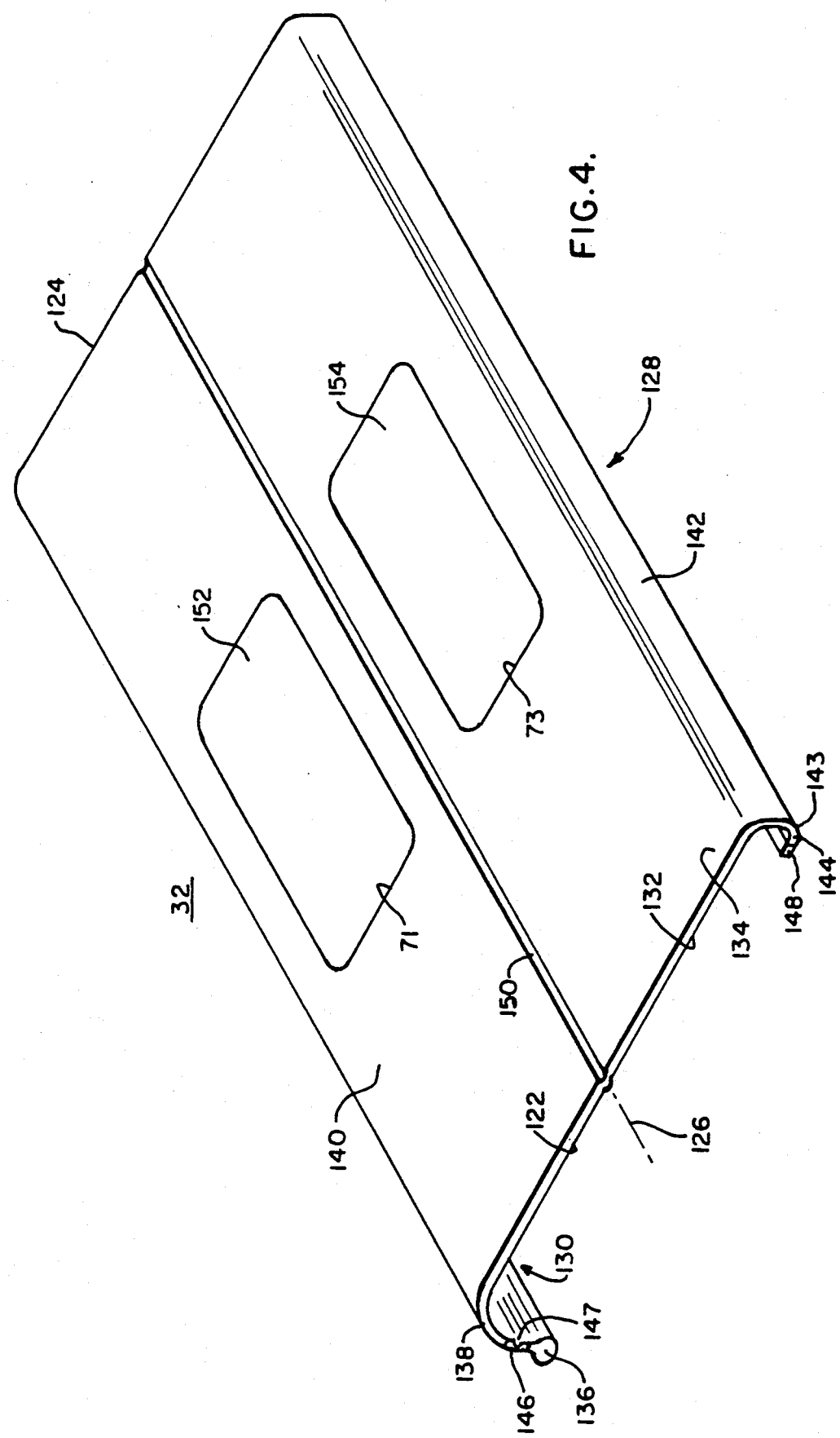
FIG. 4 is a fragmentary perspective view of one of the extruded side covers shown in FIGS. 1 and 2.

FIG. 4 is a fragmentary perspective view of side panel 32, which is identical to side panel 34. Side panel 32 is extruded from the same rigid plastic as the spine 30, such as a rigid PVC. Side panel 32 is an elongated structure having first and second ends 122 and 124, a longitudinal axis 126 between the ends, a top portion 128, a bottom portion 130, and inner and outer surfaces 132 and 134, respectively. The bottom portion 130 starts with an enlarged longitudinally extending bead 136 which has a substantially ball-shaped cross-sectional configuration dimensioned to snugly telescope into groove 108 of spine 30. Bottom portion 130 proceeds from spine attachment member 136 through a curved portion 138 to a flat major wall portion 140, with wall portion 140 continuing to the top portion 128 of the side panel. The top portion 128 curves inwardly via a curved portion 142, in the same direction from flat wall portion 140 as curved portion 138. Curved portion 138 terminates abruptly at a sharp bend 143 which connects curved portion 138 to a flange or lip 144. Flange 144 extends towards the bottom portion 130, in spaced parallel relation with the flat wall portion 140.

Side panel 32 includes a co-extruded flexible hinge 146 adjacent to the ball-like spine attachment member 136 The softer flexible hinge 146 separates the harder spine attachment member 136, which is a rigid plastic, from the harder curved portion 138, which is also a rigid plastic, i.e., a dual durometer extrusion. Hinge 146 is formed of a softer more flexible resin than the major portion of the side panel, such as flexible PVC, and it has a longitudinally extending groove 147 having a depth of about 0.030 inch on the same side of the hinge 146 as the inner surface 132 of the side panel 32. The flexible plastic of hinge 146 and hinge groove 147 cooperatively provide a repeatable hinge action which enables the side panel to be opened to floor level for easy access to the interior wire ways of raceway 18. Hereinafter, a rigid plastic will be referred to as PVC, and a softer more flexible plastic will be referred to as FPVC, but it is to be understood that many other plastic materials than the polyvinylchlorides may be used for both the rigid and flexible plastic portions of the raceway 18. As an example of what is meant by "rigid" and "flexible", the rigid plastic portions of side panel 32 and the raceway 18 should have a Shore durometer of at least 75D, while the durometer of hinge 146 and other more flexible portions of raceway 18 to be hereinafter described should have a Shore durometer in the range of about 50A to 90C.

Side panel 32 includes a co-extruded flexible tip 148 of FPVC in the top portion 128, at the end of flange 144, to provide increased friction when tip 148 snaps over and engages the hereinbefore mentioned upwardly extending retaining lip 87 on spine 30. Tip 148 has a length dimension of about 0.060 inch, for example.

As shown in FIG. 1, side panels 32 and 34 have precut receptacle openings 71 and 73 at predetermined locations, which may be visually separated and accented via a longitudinal groove 150 in outer surface 134. Until the receptacle openings 71 and 73 are used, cover pieces 152 and 154 respectively cover the openings 71 and 73.

As shown in FIG. 1, there is a space adjacent each support post 26, at the end of the raceway, or between raceways of adjacent panels, with this space being occupied by raceway shroud 39. Raceway shroud 39 is a 180 degree shroud, i.e., between two panels which have a 180 degree angle between them. Some panels intersect at a post with a 120 degree angle, some with a 90 degree angle, and some with a 135 degree angle, depending upon the desired office space dividing configuration, and the shrouds for these configurations have a like angle. All of these shrouds are located and supported from the raceway spine in a similar manner and thus it is unnecessary to illustrate each shroud in order to explain the teachings of the invention. The 180 degree shroud 39 has a cable egress feature not utilized by the other shrouds, and thus the 180 degree shroud has been selected for detailed description.

Figure 5:
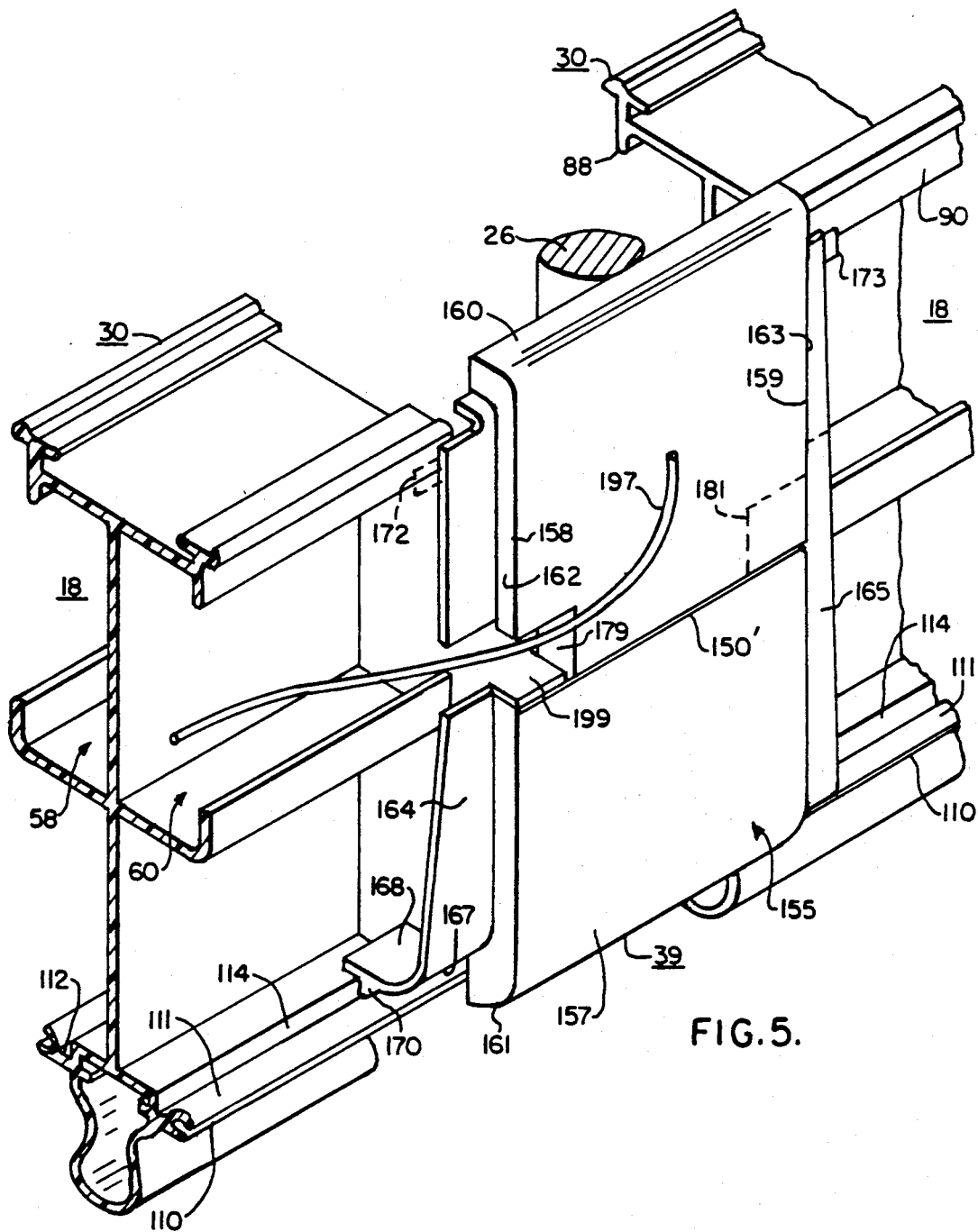
FIG. 5 is a perspective view illustrating how a raceway shroud shown in FIGS. 1 and 2 is attached to and dimensionally keyed to the spines of adjacent raceways.

FIG. 5 is a perspective view of a front side 155 of shroud 39, with shroud 39 being disposed between two adjacent raceways 18. Only the raceway spines 30 of raceways 18 are shown in FIG. 5 in order to more clearly illustrate how raceway shroud 39 is dimensionally keyed to, and supported by, the spines 30. FIG. 6 is an elevational view of the opposite or back side 156 of shroud 39, FIG. 7 is an end elevational view of shroud 39, FIG. 8 is a top plan view, and FIGS. 9 and 10 are sectional views. The sectional views are respectively taken between and in the direction of arrows IX—IX and X—X in FIG. 6.

Shroud 39 has an outer surface 157 on its front side 155 which is configured to smoothly continue the configuration and appearance of the raceway side panels 32 or 34, including a "character" line 150' which is aligned with the character lines 150 of the side panels. The outer surface 157 is defined by first and second sides 158 and 159 and upper and lower edges 160 and 161, with the first and second sides 158 and 159 adjoining side edges 162 and 163 which butt against the ends of the associated raceway side panels 32 or 34. Flanges 164 and 165 extend outwardly from the side edges 162 and 163 which provide alignment and support for the ends of the raceway side panels 32 or 34 which butt against or closely adjacent to the side edges 162 and 163. Flanges 164 and 165 increase in width, measured longitudinally with respect to the raceways 18, as they proceed downwardly from about the midpoint of the shroud 39. Near the bottom or lower edge 161 of the shroud 39 flanges 164 and 165 enter right angle bends, such as right-angle bend 167, where they join resilient, flexible support legs 168 and 169 which respectively have depending locating and bottom support ridges 170 and 171 thereon.

First and second upper locating and support tabs 172 and 173 are fixed to the back side 156 of shroud 39, with the support tabs 172 and 173 being spaced outwardly from the back side 156, as best shown in FIG. 7, and they also extend laterally outwardly beyond the extreme outer edges 175 and 177 of the adjacent thin flanges 164 and 165, as best shown in FIG. 6.

With the raceway covers 32 or 34 pivoted downwardly to their open positions on adjacent similar sides of the leveler leg 26, or before the covers 32 or 34 are assembled with the spines 30, shroud 39 is placed into its functional position by tilting the lower edge 161 outwardly while moving the shroud 39 in an angularly upward direction towards the spines 00 such that the tabs 172 and 173 go behind the depending portions 90 of the two adjacent spines 30. Once tabs 172 and 173 are behind the depending portions 90, the lower edge 161 of shroud 39 is pivoted downwardly and pressed firmly against the spines 30. The resilient, flexible support legs 168 and 169 are deflected upwardly as the locating ridges 170 and 171 are forced upwardly by the upper surface 111 of the extruded groove 110. When the upwardly facing groove 114 defined by portion 98 and extruded groove 110 of spine 30 is reached, the depending ridges 170 and 171 enter the grooves 114, allowing the upwardly bent legs 168 and 169 to return towards their unstressed configurations, to firmly hold raceway shroud 39 in the desired assembled position between the adjacent spines 30. Since the side covers 32 and 34 and raceway shrouds 39 are all positioned from and attached to the spine 30, the outer surfaces 157 of the raceway shrouds 39 are flush with the outer surfaces 134 of the adjoining raceway covers 32 and 34 when the covers are in their closed positions, and the character grooves 150 and 150' are perfectly aligned.

Shroud 39 has a cable egress feature in the form of first and second tabs 179 and 181. Since each tab is of like construction, only tab 179 will be described in detail. Tab 179 is formed during the injection molding process such that it has upper and lower sides 183 and 185 which start at the outer edge 187 of flange 164 and extend inwardly to a perpendicular inner side 189. The lower side 185 of tab 179 may run substantially along the character groove 150', for example. The upper and lower sides 183 and 185 as well as the perpendicular inner side 187 are joined to the adjacent material of the shroud via very thin webs 191, 193 and 195, respectively, as best shown in the sectional views of FIGS. 9 and 10. Grooves which form the thin webs 191, 193 and 195 extend inwardly from the back side 156 of shroud 39, and are thus not readily apparent when shroud 39 is viewed from the outer or front side 155.

Should it be desired to remove a communication cable 197 from an upper wiring passageway 58 or 60 for use at an adjacent work station, webs 191 and 193 which join the upper and lower sides of a tab, such as tab 179, are severed, either by snap breaking or cutting, and the thin web 195 which joins the inner side 189 to the adjacent material functions as a living hinge, enabling tab 179 to be hinged inwardly, as shown in FIG. 5, to allow the communication cable 197 to pass through the resulting opening 199.

Figure 12:
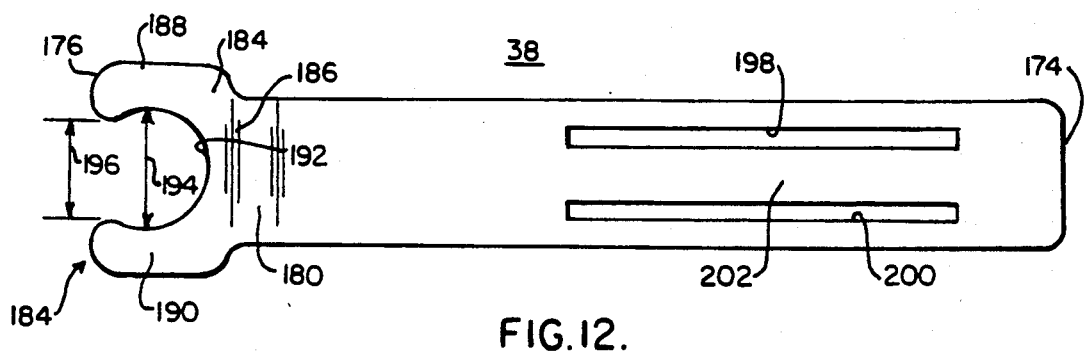
FIG. 12 is a plan view of the stabilizer member shown in FIG. 11.
Figure 11:
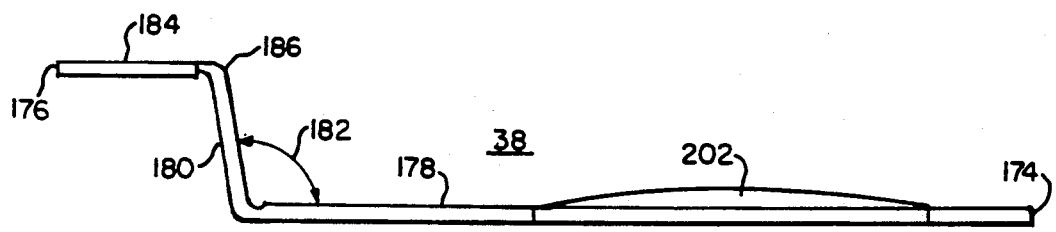
FIG. 11 is a side elevational view of the raceway stabilizer member shown in FIGS. 1 and 2, illustrating a preferred construction thereof.

FIGS. 11 and 12 are side elevational and plan views, respectively, of raceway stabilizer member 38 shown in perspective in FIG. 2. While stabilizer member 38 may be formed of metal, in a preferred embodiment it is injection molded using a high strength plastic such as polypropylene. In general, stabilizer member 38 has a first end 174 sized to slidably enter the bottom slot 92 of spine 30, and a second end 176 adapted to snugly capture a leveler rod or support leg 26 of the associated partition arrangement 16.

The first end 174 is part of a substantially flat elongated main body portion 178, which may be about 4 inches in length, for example, with body portion 178 terminating at an upstanding portion 180 which forms an obtuse angle 182 of about 100 degrees with body portion 178. The upstanding portion 180 terminates at a connector portion 184 via a bend 186 which places connector portion 184 in a plane parallel with the plane of the main body portion 178. Connector portion 184 is substantially U-shaped, having outwardly spaced fingers 188 and 190 which partially surround a circular opening 192 having a diameter 194 selected to snugly encompass leveler leg 26. The spacing 196 between the fingers 188 and 190 leading into opening 192 is less than diameter 194, which requires that the fingers 188 and 190 be flexed slightly in order to position leveler leg 26 within opening 192, and also to remove the stabilizer member 38 from engagement with leveler leg 26, ensuring a firm engagement which will not accidentally become dislodged.

To enable stabilizer member 38 to assume installation and operative positions within bottom slot 92 of spine 30, while retaining a firm frictional engagement between stabilizer member 38 and the internal walls of bottom slot 92, the main body portion 178 includes a pair of spaced longitudinally extending slots 198 and 200. The portion of stabilizer 38 between the spaced slots is in the form of an upwardly curved resilient member 202 that rises above the flat main body portion 178 by a dimension of about 0.050 inches The upwardly curved resilient member 202 functions as a leaf spring, constantly exerting a pressure against the top of the slot 92 which causes stabilizer member 38 to remain in any selected position within the slot 92. Thus, stabilizer member 38 may initially be placed in a position which enables the stabilizer member 38 to clear leg 26 as the partition assembly 16 and raceway 18 are positioned between the support poles 24 and leveler legs 26, and then retracted to an operative or functional position in which the connector portion 184 engages the leveler leg 26.

The mounting strip 36 shown in perspective in FIG. 2, is shown in an end view in FIG. 13. Mounting strip 36 is an elongated plastic member, such as PVC, which is extruded to a hat-shaped cross section having a flat central upper portion 204. The lateral edges of portion 204 curve downwardly and outwardly into depending flanges 206 and 208, and flanges 206 and 208 curve outwardly into end flanges 210 and 212. End flanges 210 and 212 are parallel to the central upper portion 204, and they are dimensioned to slidably enter the upper C-shaped slot 76.

To ensure a friction fit when spine 30 is telescoped into position on mounting strip 36, flexible friction beads or pads 214 formed of FPVC are co-extruded on the downwardly facing surfaces of the end flanges 210 and 212. Mounting strip 36 has a plurality of openings 216 in the flat upper portion 204 and the mounting strip is secured to the bottom of the partition or panel 20 via a plurality of fasteners or screws 218 via the openings 216. Raceway 18 is telescoped into position on mounting strip 36 before the panel 20 is installed, and thus the friction pads 214 have little weight on them, enabling the raceway 18 to be installed with relative ease. Once the panel 20 is installed and weight placed on the raceway 18 to compress the noise and light seal or boot 116, the friction pads 214 are pressed tightly against the spine 30, ensuring that there will be no movement or slippage between the spine 30 and mounting strip 36.

FIG. 14 is an end view of raceway 18 which illustrates (1) the mounting strip 36 fastened to the bottom edge of panel 20; (2) the mounting edges 136 of side panels 32 and 43 telescoped into the extruded grooves 108 and 112 of spine 30; and (3) the spine 30 telescoped into position on mounting strip 36.

FIG. 14 is an end view of raceway 18 similar to that of FIG. 13, except illustrating communication wiring 66 disposed in the upper two wiring passageways 58 and 60, and a terminal block 72 in an operative position within the two lower wiring passageways 62 and 64. Stabilizer 38 is also shown in section in FIG. 11, and boot 116 is illustrated in phantom outline in a compressed operative position on a floor 224. Raceway 18 is also illustrated with side panel 34 in a partially open position via hinge 146.

FIG. 15 is a view similar to FIG. 13, except illustrating an embodiment of the invention in which a dual durometer hinge 222 is co-extruded at the position of the longitudinally extending groove 150. Hinge 222 may be formed of FPVC, for example, while the areas of the panel adjacent to the hinge 222 may be formed of PVC. Further, the FIG. 15 embodiment includes intermediate cooperative means 224 for removably attaching the side panels 32 and 34 to the spine 30 along a line adjacent to groove 150, as well as via upper cooperative means 226 comprising the hereinbefore described lip 87 and finger 148 at the top of side panel 32. Unmodified components are given the same reference numerals in FIG. 15, and modified components use the same reference numerals with a prime mark.

More specifically, shelves 50' and 52' each have a substantially Z-shaped member 226 rising upwardly from a midpoint thereof, which replaces the end flanges 54 and 56. Since each side of the raceway 18 is modified exactly the same, only the side adjacent to side wall member 32' will be described in detail. Z-shaped member 226 includes an upstanding vertical wall 228, an outwardly extending horizontal wall 230, and an upstanding wall 232. Shelf 50' and horizontal wall 230 are configured to provide an opening 234 which functions as a releasable catch for a compressible member 236 which extends integrally outward from the inner surface 132 of side panel 32'. The compressible member 236, for example, may include vertically spaced upper and lower fingers 238 and 240, which are compressed towards one another when side panel 32' is pressed against spine 30'. Thus, as shown relative to side panel 34', the upper cooperative means 226 may be uncoupled and hinge 222 actuated to gain access to wiring passageway 60 without exposing the lower wiring passageway 64. If access is required to the lower wiring passageway 64, then the upper cooperative means 226 and the intermediate cooperative means 224 would both be uncoupled, and the lower hinge 146 would be operated to pivot side panel 34' to a completely open position.

We claim:

1. A space dividing office system, including a partition having an electrical raceway below a bottom edge thereof, comprising:
    an elongated extruded plastic spine having first and second ends, a centrally disposed vertical web having first and second sides, with said vertical web extending between the first and second ends, a bottom portion which includes a depending compressible noise seal and first and second extruded grooves on opposite sides of said noise seal,
    first and second extruded plastic seal panels each having first and second ends, a longitudinal axis between the first and second ends, inner and outer surfaces defining a thickness dimension of the panel, a top, and a bottom having a mounting edge which is enlarged with respect to the thickness dimension of the panel,
    said first and second extruded grooves each having a cross-sectional configuration which is complementary to the enlarged mounting edges of the first and second side panels, including an opening at longitudinal ends of the groove corresponding to the enlarged portion of a mounting edge, and a lateral opening corresponding to the thickness dimension of a side panel,
    the mounting edges of the first and second side panels being respectively telescoped into and frictionally engaged with the first and second extruded grooves of the spine,
    and means for attaching the spine to the bottom edge of the partition.

2. The space dividing office system of claim 1 wherein the spine includes a top portion having an upwardly open C-shaped slot, and wherein the means for attaching the spine to the bottom edge of the partition includes a mounting strip having a substantially hat-shaped cross-sectional configuration, and means fixing the mounting strip to the bottom edge of the space dividing partition, wherein the C-shaped upwardly facing slot of the spine is telescoped over the hat-shaped mounting strip.

3. A space dividing office system, including a partition having an electrical raceway below a bottom edge thereof, comprising:
    an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal,
    first and second extruded plastic side panels each having first and second ends, a longitudinal axis between the first and second ends, inner and outer surfaces, a top, and a bottom having a mounting edge,
    the mounting edges of the first and second side panels being respectively telescoped into and frictionally engaged with the first and second extruded grooves of the spine,
    and means for attaching the spine to the bottom edge of the partition,
    said spine including a top portion having an upwardly open C-shaped slot,
    said means for attaching the spine to the bottom edge of the partition including a mounting strip having a substantially hat-shaped cross-sectional configuration, and means fixing the mounting strip to the bottom edge of the space dividing partition, wherein the C-shaped upwardly facing slot of the spine is telescoped over the hat-shaped mounting strip,
    said mounting strip being an extruded plastic member which includes first and second laterally extending flanges over which the C-shaped upwardly facing slot is telescoped, with each of the first and second laterally extending flanges having at least one outwardly extending co-extruded friction pad formed of a softer plastic than the remaining portion of the mounting strip, with said co-extruded friction pads frictionally engaging the spine to resist disassembly of the spine from the mounting strip.

4. The space dividing office partition system of claim 1 including first and second shelves between the bottom and top portions of the spine which extend perpendicularly outward from the first and second sides, respectively, of the vertical web, to define two wiring passageways above the shelves, one on each side of the vertical web, and two wiring passageways below the shelves, one on each side of the vertical web.

5. A space dividing office system, including a partition having an electrical raceway below a bottom edge thereof, comprising:
an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal,
first and second extruded plastic side panels each having first and second ends, a longitudinal axis between the first and second ends, inner and outer surfaces, a top, and a bottom having a mounting edge,
the mounting edges of the first and second side panels being respectively telescoped into and frictionally engaged with the first and second extruded grooves of the spine,
and means for attaching the spine to the bottom edge of the partition,
said depending noise seal being co-extruded with the spine, with the noise seal being formed of a softer plastic than the remainder of the spine, selected such that the noise seal deforms under pressure to closely conform to the floor on which the partition is mounted.

6. A space dividing office system, including a partition having an electrical raceway below a bottom edge thereof, comprising:
an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal,
first and second extruded plastic side panels each having first and second ends, a longitudinal axis between the first and second ends, inner and outer surfaces, a top, and a bottom having a mounting edge,
the mounting edges of the first and second side panels being respectively telescoped into and frictionally engaged with the first and second extruded grooves of the spine,
means for attaching the spine to the bottom edge of the partition,
first and second leveler legs disposed at opposite ends of the partition which provide support therefor,
said spine including an extruded bottom slot near the bottom portion which extends between the first and second ends of the spine,
and first and second raceway stabilizer members having first ends disposed in the extruded bottom slot at the first and second ends of the spine, and second ends which respectively engage the first and second leveler legs, to provide lateral support for the bottom portion of the spine.

7. The space dividing partition system of claim 6 wherein each stabilizer member includes a curved resilient portion between the first and second ends which is stressed by the bottom slot towards a non-curved configuration, providing a continuous frictional engagement between the bottom slot and stabilizer member.

8. The space dividing partition system of claim 7 wherein the stabilizer member is formed of plastic, with the stabilizer member having an elongated body portion between the first and second ends, with the curved resilient portion being an integral section of the body portion which functions as a leaf spring.

9. A space dividing office system, including a partition having an electrical raceway below a bottom edge thereof, comprising:
an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal,
first and second extruded plastic side panels each having first and second ends, a longitudinal axis between the first and second ends, inner and outer surfaces, a top, and a bottom having a mounting edge,
the mounting edges of the first and second side panels being respectively telescoped into and frictionally engaged with the first and second extruded grooves of the spine,
and means for attaching the spine to the bottom edge of the partition,
said first and second side panels each having a co-extruded hinge portion near the bottom of the side panel.

10. A space dividing office system, including a partition having an electrical raceway below a bottom edge thereof, comprising:
an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal,
first and second extruded plastic side panels each having first and second ends, a longitudinal axis between the first and second ends, inner and outer surfaces, a top, and a bottom having a mounting edge,
the mounting edges of the first and second side panels being respectively telescoped into and frictionally engaged with the first and second extruded grooves of the spine,
and means for attaching the spine to the bottom edge of the partition,
said spine including a top portion having first and second upwardly extending lips, on opposite sides of the vertical web,
said first and second side panels having co-extruded, depending latch portions which snap over the first and second upwardly extending lips, respectively, to hold the first and second side panels in assembled relation with the spine, with the co-extruded latch portions being formed of a softer plastic than the major portions of the side covers.

11. A space dividing office system, including a partition having an electrical raceway below a bottom edge thereof, comprising:
an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal, first and second extruded plastic side panels each having first and second ends, a longitudinal axis between the first and second ends, inner and outer surfaces, a top, and a bottom having a mounting edge, the mounting edges of the first and second side panels being respectively telescoped into and frictionally engaged with the first and second extruded grooves of the spine, means for attaching the spine to the bottom edge of the partition, first cooperative means associated with the top portions of the first and second side panels and the top portions of the spine, for removably securing the first and second side panels to the spine, first and second shelves between the bottom and top portions of the spine which extend perpendicularly outward from the first and second sides, respectively, of the vertical web, to define two wiring passageways above the shelves and two wiring passageways below the shelves, lower and intermediate hinges in each side panel, and second cooperative means associated with said first and second shelves and with the first and second side panels, for removably securing the first and second side panels to the first and second shelves, respectively, at a location just below said intermediate hinge, whereby access to the wiring passages above the shelves may be gained by operating the first cooperative means and the intermediate hinge, and access to all wiring passages may be gained by operating the first and second cooperative means and the lower hinge.

12. The space dividing partition system of claim 11 wherein the first and second side panels are extruded, with at least the lower hinge being co-extruded, using a softer plastic for at least the lower hinge than the remainder of the side panel.

13. The space dividing partition system of claim 11 wherein the first and second side panels are extruded, with at least the intermediate hinge being co-extruded, using a softer plastic for at least the intermediate hinge than the remainder of the panel.

14. A space dividing office syste, including a partition having an electrical raceway below a bottom edge thereof, comprising:

an elongated extruded plastic spine having first and second ends, a centrally disposed vertical web having first and second sides, with said vertical web extending between the first and second ends, a bottom portion which includes a depending noise seal and first and second extruded grooves on opposite sides of said noise seal, first and second extruded plastic side panels each having first and second ends, a longitudinal axis between the first and second ends, inner and outer surfaces, a top, and a bottom having a mounting edge, the mounting edges of the frist and second side panels being respectively telescoped into and frictionally engaged with the first and second extruded groove of the spine, means for attaching the spine to the bottom edge of the partition, a receptacle opening in at least one of the first and second side panels, a terminal block opening in the vertical web of the spine, adjacent to the receptacle opening, a terminal block mounted in said terminal block opening, and a receptacle associated with said terminal block which is accessible via the receptacle opening in the at least one side panel.

15. The space dividing partition system of claim 1 including a ppst at least one end of the partition, and a raceway shroud removably fixed to the spine which conceals the post.

16. A space dividing office system, comprising:

a support post, first and second partitions supported by the support post, first and second raceways depending from the bottom edges of said first and second partitions, respectively, each of said raceways including an elongated extruded plastic spine having first and second ends, a centrally disposed vertical web having first and second sides, with said vertical web extending between the first and second ends, and a bottom having first and second portions which respectively extend outwardly from the first and second sides of the vertical web, with the first and second bottom portions respectively defining first and second extruded grooves, first, second, third, and fourth extruded plastic side panels each having first and second ends, a longitudinal axis between the first and second ends, inner and outer surfaces defining a thickness dimension of the panel, a top, and a bottom having a mounting edge which is enlarged with respect to the thickness dimension of the panel, said first and second extruded grooves each having a cross-sectional configuration which is complementary to the enlarged mounting edges of the first and second side panels, including an opening at longitudinal ends of the groove corresponding to the enlarged portion of a mounting edge, and a lateral opening corresponding to the thickness dimension of a side panel, the mounting edges of the first and second side panels being respectively telescoped into and frictionally engaged with the first and second extruded grooves of the spine of the first raceway, the mounting edges of the third and fourth side panels being respectively telescoped into and frictionally engaged with the first and second extruded grooves of the spine of the second raceway, and a plastic shroud disposed between and removably fixed to the spines of the first and second raceways to conceal the post.

17. A space dividing office system, comprising:

a support post, first and second partitions supported by the support post, first and second raceways depending from the bottom edges of said first and second partitions, respectively, each of said raceways including an elongated extruded plastic spine having first and second ends, a centrally disposed vertical web having first and second sides, with said vertical web extending between the first and second ends, and a bottom having first and second portions which respectively extend outwardly from the first and second sides of the vertical web, with the first and second bottom portions respectively defining first and second extruded grooves, first, second, third, and fourth extruded plastic side panels each having first and second ends, a longitudinal axis between the first and second ends, inner and outer surfaces, a top, and a bottom having a mounting edge, the mounting edges of the first and second side panels being respectively telescoped into and frictionally engaged with the first and second extruded grooves of the spine of the first raceway, the mounting edges of the third and fourth side panels being respectively telescoped into and frictionally engaged with the first and second extruded grooves of the spine of the second raceway, and a plastic shroud disposed between and removably fixed to the spines of the first and second raceways to conceal the post, said second and fourth side panels being aligned with one another, said shroud having an outer surface which is flush with the outer surfaces of the second and fourth side panels.

18. A space dividing office system, comprising:

a support post, first and second partitions supported by the support post, first and second raceways depending from the bottom edges of said first and second partitions, respectively, each of said raceways including an elongated extruded plastic spine having first and second ends, a centrally disposed vertical web having first and second sides, with said vertical web extending between the first and second ends, and a bottom having first and second portions which respectively extend outwardly from the first and second sides of the vertical web, with the first and second bottom portions respectively defining first and second extruded grooves, first, second, third, and fourth extruded plastic side panels each having first and second ends, a longitudinal axis between the first and second ends, inner and outer surfaces, a top, and a bottom having a mounting edge, the mounting edges of the first and second side panels being respectively telescoped into and frictionally engaged with the first and second extruded grooves of the spine of the first raceway, the mounting edges of the third and fourth side panels being respectively telescoped into and frictionally engaged with the first and second extruded grooves of the spine of the second raceway, and a plastic shroud disposed between and removably fixed to the spines of the first and second raceways to conceal the post, each spine including first and second upper flanges which extend outwardly from the first and second sides of the vertical web, with each of the first and second upper flanges having a depending portion, said shroud including first and second tabs which are disposed behind said depending portions of the spines of the first and second raceways.

19. The space dividing system of claim 18 wherein the first and second bottom portions of each spine each define a longitudinally extending groove, and wherein the shroud includes first and second outwardly extending resilient leg portions which snap into said longitudinally extending grooves of the spines of the first and second raceways, which, along with the first and second tabs, removably fixed the shroud to the spines of the first and second raceways.

* * * * *